Jan. 17, 1933.  K. MUCHENBERGER-WITTLINGER  1,894,320
SINGLE AXLE TIPPING TRAILER
Filed Dec. 28, 1931
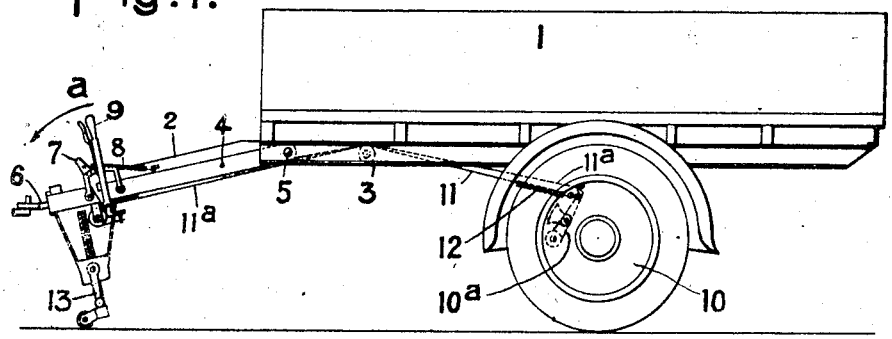
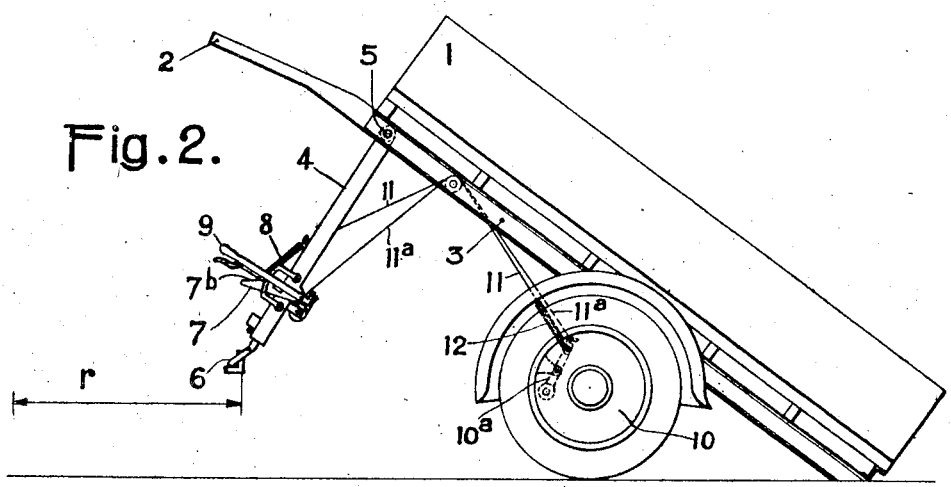
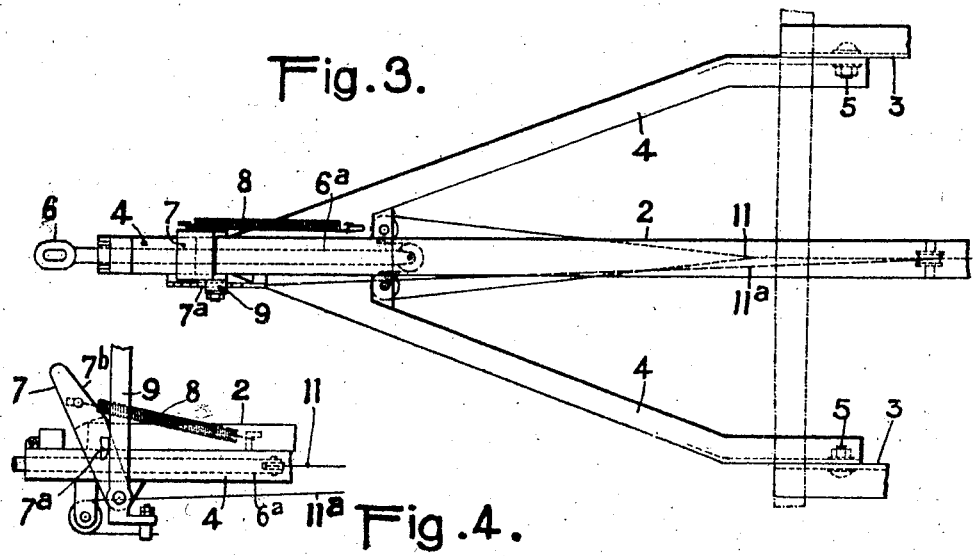
Inventor
Karl Muchenberger-Wittlinger
By C. F. Wenderoth, Atty Patented Jan. 17, 1933

1,894,320

UNITED STATES PATENT OFFICE

KARL MUCHENBERGER-WITTLINGER, OF RIEHEN NEAR BASEL, SWITZERLAND

SINGLE AXLE TIPPING TRAILER

Application filed December 28, 1931, Serial No. 583,450, and in Switzerland January 8, 1931.

The invention relates to a single axle tipping trailer provided with a tipping mechanism, the loading body of the trailer being adapted to be automatically tipped, after the disengagement of a beam coupling, by a backward movement of the tractor of the trailer. This is rendered possible, according to the invention, by that the beam pivoted on the trailer frame is held in a lying position ready for traction, by means of a releasable coupling, and by that the brakes of the trailer, upon backward movement of the tractor, will be automatically applied in such a manner, that the trailer which is now prevented from yielding in the backward direction will be tilted about the wheel axle thereof, by releasing the coupling, on account of the beam being lifted into an inclined position in consequence of the backward movement of the tractor.

The invention will now be described, by way of example, with reference to the accompanying drawing, in which:

Figure 1 illustrates a side elevation of the trailer in the position ready for traction by pull.

Figure 2 illustrates a similar view of the trailer, but in its tilted position.

Figures 3 and 4 illustrate on a larger scale details of the trailer shown in Figures 1 and 2.

The middle portion of the frame of the loading body 1 extends forward (Figure 2) and forms a coupling bar 2, whilst the movable beam 4 consisting of a fork is pivoted at 5 on the side parts 3 of the body. At the front end of the forked beam 4 is provided the usual attaching ring 6 allowing the trailer to be linked to the tractor, a hook being provided to this end at the back of the tractor. A coupling pawl 7 urged by a strong spring 8 is pivoted on the beam 4, this pawl being provided with a lateral projection 7$^a$ by means of which it rests against a hand operatable lever 9. Normally, the coupling bar 2 is coupled to the movable beam 4 by means of the pawl 7 which takes over the bar 2 (Figure 4). This coupling is ensured by the spring 8. By moving the lever 9 in the direction of the arrow $a$ (Figure 1), the pawl 7 will be released, whereby the uncoupling of the movable beam 4 will take place.

The trailer is provided with a wheel brake drum 10 for the purpose of braking same. The shaft 6$^a$ of the attaching ring 6 is connected to a brake operating lever 10$^a$ by means of a wire or rope transmission 11 (Figure 3), in such a way that when a pull is exerted on the attaching ring 6, the brake of the trailer is released, whilst a backward movement of the tractor will cause the attaching ring shaft 6$^a$ to act on the wire or rope transmission 11 in such a manner, that a pull will be exerted on the inserted traction spring 12, whereby the brake of the trailer will be applied.

The brake operating lever 10$^a$ of the trailer is also connected to the hand lever 9 through the medium of a wire or rope transmission 11$^a$ (Figure 4). The manual braking serves merely for safety purposes. The hand lever 9 is adapted to be locked on a notched locking segment. The wire or ropes 11 and 11$^a$ are guided in their mid part by a guide roller mounted on the trailer frame 3.

When the trailer is to be tipped, the tractor is driven just a little backward to cause the automatic application of the brake of the trailer through the wire or rope transmission 11, while simultaneously the hand lever 9 is moved in the direction of the arrow $a$, in order to disengage the coupling pawl 7 on the one hand, and on the other hand for the purpose of assisting the automatic braking effect on the trailer. In consequence of the braking of the trailer, the latter will not be allowed to yield backwards and the backward movement of the tractor will thus cause the beam 4 to be lifted into an inclined position (Figure 2), whereby the loading body 1 of the trailer will be tilted about the wheel axle thereof. The distance which the tractor must be driven back in order to cause the tipping of the trailer is designated by $r$ in Figure 2. During the discharge of the trailer the hand lever 9 is moved back to its initial position.

When after the unloading of the trailer, the tractor is again driven forward, the beam 4 is returned to its lying position and the coupling bar 2, which simultaneously comes to abut by its end against the bevelled nose 7ª of the pawl 7 and pushes the latter aside, is finally engaged by the catching pawl 7, so that the two parts 2 and 4 are again coupled together and ready to take up a pulling action. Simultaneously with the engagement of the coupling of the traction beam 4 in its position ready for traction, the brake cheek on the brake drum has been loosened owing to the release of the tensioning in the wire or rope transmission 11.

The beam 4 can be provided with a supporting stilt 13 at its front end, this stilt 13 being shown in dot and dash lines in Figure 1.

What I claim is:—

1. In a single axle tipping trailer, a frame, a forwardly projecting beam pivoted on the front end of the trailer frame, a draft member thereon, movable relatively thereto, a forwardly projecting coupling bar rigidly connected to the trailer frame, a releasable coupling device on said beam to connect the same to the coupling bar when being in its lying position ready for traction, means for releasing said coupling device, an automatically operating brake for the trailer wheels, a flexible traction member between said brake and said draft member, for operating the brake on release of the traction effort, guide means on the trailer frame for said flexible traction member, said beam being so arranged as to be obliquely erected for tilting the trailer upon a backward push thereon after release of said coupling device.

2. In a single axle tipping trailer, a frame, a forwardly projecting beam pivoted on the front end of the trailer frame, a draft member thereon, movable relatively thereto, a forwardly projecting coupling bar rigidly connected to the trailer frame, a releasable coupling device on said beam to connect the same to the coupling bar when being in its lying position ready for traction, means for releasing said coupling device, an automatically operating brake for the trailer wheels, a flexible traction member between said brake and said draft member, for operating the brake on release of the traction effort, guide means on the trailer frame for said flexible traction member, a hand lever for operating said coupling device, connecting means between said hand lever and said brake to allow the operator additionally to act thereupon, said beam being so arranged as to be obliquely erected for tilting the trailer upon a backward push thereon after release of said coupling.

In witness whereof I have hereunto signed my name this 18th day of December 1931.

KARL MUCHENBERGER-WITTLINGER.